US008430322B2

(12) United States Patent  
Dhers

(10) Patent No.: US 8,430,322 B2  
(45) Date of Patent: Apr. 30, 2013

(54) SMART CARD

(75) Inventor: Gilles Dhers, Carnoux en Provence (FR)

(73) Assignee: Gemalto SA, Meudon (FR)

( * ) Notice: Subject to any disclaimer, the term of this patent is extended or adjusted under 35 U.S.C. 154(b) by 1947 days.

(21) Appl. No.: 10/498,564

(22) PCT Filed: Dec. 18, 2002

(86) PCT No.: PCT/FR02/04430
§ 371 (c)(1),
(2), (4) Date: Jun. 14, 2004

(87) PCT Pub. No.: WO03/052685
PCT Pub. Date: Jun. 26, 2003

(65) Prior Publication Data
US 2005/0077164 A1    Apr. 14, 2005

(30) Foreign Application Priority Data

Dec. 18, 2001   (FR) ..................... 01 16842

(51) Int. Cl.
*G06K 19/06* (2006.01)
(52) U.S. Cl.
USPC .......................... 235/492; 235/487
(58) Field of Classification Search .......... 235/492, 235/487–489
See application file for complete search history.

(56) References Cited

U.S. PATENT DOCUMENTS

| | | | | |
|---|---|---|---|---|
| 5,682,296 A | * | 10/1997 | Horejs et al. | 361/737 |
| 5,780,837 A | * | 7/1998 | Garcia | 235/492 |
| 6,031,459 A | * | 2/2000 | Lake | 340/572.8 |
| 6,112,901 A | | 9/2000 | Noga et al. | |
| 6,395,373 B2 | * | 5/2002 | Conti et al. | 428/138 |
| 6,448,638 B1 | * | 9/2002 | Fidalgo et al. | 257/679 |
| 6,575,375 B1 | * | 6/2003 | Boccia et al. | 235/492 |
| 6,588,658 B1 | * | 7/2003 | Blank | 235/380 |
| 6,623,039 B2 | * | 9/2003 | Thompson et al. | 283/61 |
| 6,648,232 B1 | * | 11/2003 | Emmert | 235/488 |
| 6,665,931 B2 | * | 12/2003 | Yamaguchi et al. | 29/850 |
| 6,810,580 B2 | * | 11/2004 | Yamaguchi et al. | 29/748 |

OTHER PUBLICATIONS

Boccia et al (WO 73989 A1), Adapted for a chip card having a reduced format in comparison with the standard SIM mini-card format, Dec. 7, 2000.*
Housse et al (WO 9938118 A2), Integrated circuit contact card comprising a detachable minicard, Jul. 29, 1999.*
Housse et al (WO 17814 A1), Large format smart card comprising a removable minicard and method for making same, Mar. 30, 2000.*
Elbaz (WO 9954846 A1), Method for making a contact integrated circuit card and resulting card, Oct. 28, 1999.*
Schmidt (DE 19726203 C1), Mini chip-card produced as attachment to carrier card e.g. for telephone-, access- or identification-card, Oct. 1, 1998.*
Joussen (DE 4406472 A1), Subscriber system esp. for digital mobile radiotelephone network, Sep. 28, 1995.*

* cited by examiner

*Primary Examiner* — Daniel St Cyr
(74) *Attorney, Agent, or Firm* — Buchanan Ingersoll & Rooney PC

(57) ABSTRACT

A smart card is constituted by a card body made of a first material that is integral with a support made of a second material. The body is overmoulded on the surface of the support such that the card is made integral therewith by local bonding of the first and second materials.

8 Claims, 1 Drawing Sheet

SMART CARD

This disclosure is based upon French Application No. 01/16842, filed Dec. 18, 2001, and International Application No. PCT/FR02/04430, filed Dec. 18, 2002, the contents of which are incorporated herein by reference.

BACKGROUND OF THE INVENTION

The present invention concerns a card of the smart card type, comprising a card body generally made of a plastic material, containing for example in a cavity provided for that purpose one or more integrated circuits with electrical contacts forming an intelligent module also called a chip.

The invention concerns more precisely, but in a non-limiting manner, mini-cards. Known smart cards have a standardised format: they have the shape of a rectangle approximately 8.5 cm long by approximately 5.4 cm wide. In certain applications, this format is not ideal. For example, in current portable telephones, the format mentioned above, despite its small size, is unusable.

Thus, in this type of application, smart cards with a format smaller than the format mentioned above, also referred to as mini-cards, are used. According to a well-known design, it is possible to simply convert the support card into a mini-card by detaching the latter from the support by breaking linking straps or bridges connecting the mini-card to its support, this breaking possibly being performed manually.

The method of manufacturing the support and the mini-card requires a machining step for cutting out the slot allowing detachment of the mini-card, or else, in the case of moulded cards, the use of a complex injection mould.

Furthermore, in many applications, the end user needs only the mini-card, and the support itself is not used.

Current cards are manufactured by pressing or moulding using materials such as PVC (polyvinyl chloride), PET (polyethylene terephthalate) or ABS (acrylonitrile butadiene styrene). These materials are relatively expensive and constitute practically 95% by weight of the mini-card/support assembly. Consequently, there is considerable waste in the current design of mini-cards.

Moreover, the material constituting the support is a plastic material which is non-biodegradable and therefore harmful to the environment.

SUMMARY OF THE INVENTION

The aim of the present invention is to develop a card of the smart card type carried by a support, possibly capable of being detached from this support, having an intrinsic and/or manufacturing cost lower than the known cards of this type.

To that end, the present invention proposes a card of the smart card type comprising a card body made of a first material, said card body being integral with a support made of a second material, characterised in that said body is overmoulded on the surface of said support so that said card is made integral therewith by local welding of said first and second materials.

Overmoulding is a very simple operation, which, in the case of mini-cards, avoids the highly accurate machining or moulding operations, and therefore reduces the manufacturing cost.

Furthermore, by virtue of the invention, different materials can be used for the card body and for the support, which makes it possible to choose for the support a material with a lower cost and/or one which is biodegradable.

The card according to the invention can therefore highly advantageously constitute a mini-card, in particular a SIM mini-card.

According to the invention, when the first and second materials are distinct plastic materials, the card body is overmoulded on the support at a temperature higher than the respective vitreous transition temperatures of the materials and close to the transformation temperature of said second material.

When the first and second materials are identical plastic materials, the card body is overmoulded on the support at a temperature at least 100° C. higher than the vitreous transition temperature of the materials.

Thus, by simple heating, a local melting of the materials of the card body and of the support is caused, which leads to a local inter-diffusion of the two materials making it possible to obtain mechanical and partly chemical bonding, without the use of an intermediate adhesive.

This is an important advantage, since the use of an intermediate adhesive would make necessary manufacture in two stages (smart card on the one hand, support on the other), and a subsequent step of bonding the two elements, which would increase the manufacturing cost prohibitively.

The method according to the invention also avoids the necessity of forming a slot by machining or moulding in the case of manufacture of a mini-card, so that it is clearly less expensive than the methods of the prior art.

Advantageously, each of the plastic materials has a transformation temperature approximately 150° C. higher than its vitreous transition temperature. This makes it possible to ensure that the vitreous transition temperature of the support is greatly exceeded during the overmoulding and therefore that the desired adhesion is obtained.

BRIEF DESCRIPTION OF THE DRAWINGS

Other characteristics and advantages of the present invention will emerge from a reading of the following description of one embodiment of the present invention, given by way of illustration and in no way limiting.

In the following figures.

In all these figures, the common items bear the same reference numbers.

DETAILED DESCRIPTION

Figure 1:
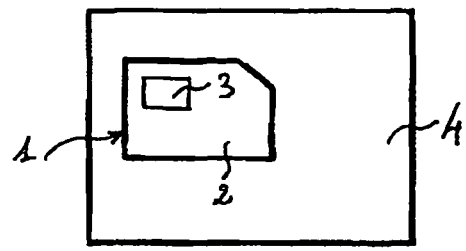
FIG. 1 depicts highly schematically a card according to the invention.

FIG. 1 shows a smart card 1 according to the invention, comprising a card body 2 equipped, in a cavity provided for that purpose (not depicted), with a chip 3. The smart card 1 illustrated in FIG. 1 is a mini-card of the SIM mini-card type, usable in particular in current mobile telephones. The card body 2 is for example made of ABS.

According to the invention, the card body 2 is integral with a support 4 made of paper for example, by overmoulding the card body 2 on the surface of the support 4 so as to cause welding of the ABS of the card body 2 and the paper of the support 4. There is no adhesive or any other bonding intermediary between the card body 2 and the support 4.

Figure 2:
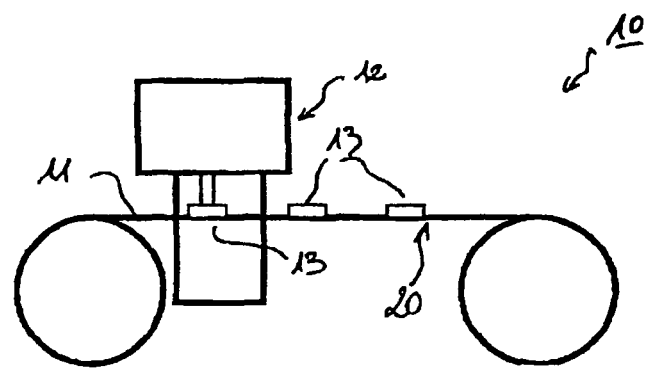
FIG. 2 illustrates also highly schematically a device for implementing the method according to the invention.

To manufacture a card according to the invention, a device 10 depicted highly schematically in FIG. 2 is used. A strip of paper 11 intended to form the support 4 is moved along inside an injection mould 12, preferably a multi-cavity mould (not depicted), that is to say one allowing several card bodies to be overmoulded simultaneously. The strip of paper 11 can be pre-printed.

At regular intervals on the strip of paper 11, the injection mould 12 applies the cavity 13 used to inject the card body 2 on the strip of paper 11, and then injects the plastic material (ABS) into this cavity 13 so as to perform the overmoulding of the card body 2 on the support 4. For this, the movement of the strip of paper 11 is stopped periodically.

The insertion of the chip 3 is performed either at the same time, or afterwards by insetting.

Figure 3:
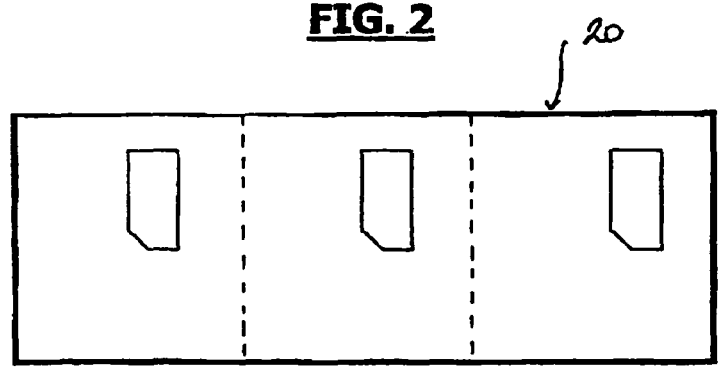
FIG. 3 shows a strip resulting from the method implemented by the device of FIG. 2.

At the output of the device 10, a strip 20 is obtained, a piece of which is depicted schematically in FIG. 3. It is then sufficient to cut up the strip 20 to form the cards according to the invention such as the one depicted in FIG. 1.

In the method according to the invention, the overmoulding temperature is chosen so as to allow on the one hand sufficient adhesion of the card body 2 to the support 4 so as to weld the two items together and prevent unintentional separation of the card 1, and on the other hand manual detachment of the card 2 with no residue of material coming from the support 4 on its lower face.

Thus, when the materials constituting the card body 2 and the support 4 are plastic materials distinct from one another, for example when the card body is made of ABS and the support is made of PET (polyethylene terephthalate), the temperature of the overmoulding is higher than the respective vitreous transition temperatures of the two materials and close to the transformation temperature of the PET constituting the support 4.

In this example, an overmoulding temperature of approximately 250° C. can for example be chosen, given that the vitreous transition temperature of ABS is close to 100° C., that of PET is close to 80° C., and the transformation temperature of ABS and PET is close to 250° C.

When the plastic materials constituting the card body 2 and the support 4 are identical plastic materials, for example when the card body and the support are made of ABS, the temperature of the overmoulding is preferably at least 100° C. higher than the vitreous transition temperature of the material. It can be approximately 250° C. in the case of ABS.

Of course, the invention is not limited to the embodiment which has just been described.

Thus, it can concern not only a SIM mini-card, but also any other type of smart card that it is wished to make integral with a support whilst being detachable therefrom.

Furthermore, any type of material whatsoever can be chosen for the card body and for the support, since these two materials can be welded to one another during the overmoulding. In general, nevertheless, the card body will always be made of plastic material, whereas the support may not be (paper, biodegradable material).

The method according to the invention can be applied to strips of support that are then cut up, or to supports pre-cut to the desired format (for example a visiting card), with pre- or post-printing.

Furthermore, in order to facilitate the card being made integral with the support, in particular where the materials constituting the card and the support are poorly compatible with each other, pressing of the support prior to the overmoulding of the card can be performed in order to increase the mechanical holding of said card on the support.

Finally, any means can be replaced with an equivalent means without departing from the scope of the invention.

The invention claimed is:

1. A smart card comprising a card body made of a first material and having a predetermined size format, said card body being overmoulded on the surface of a support made of a second material and having a size larger than said predetermined size format, so that said card body is made integral therewith by local welding of said first and second materials, wherein said support is made of a material chosen from paper and biodegradable materials.

2. A card according to claim 1, wherein said card body is detachable from said support.

3. A card according to claim 1, wherein said card comprises a mini-card.

4. A card according to claim 3, wherein said mini-card comprises a SIM mini card.

5. A method of manufacturing a card comprising a card body made of a first material and having a predetermined size format, and a support made of a second material and having a size larger than said predetermined size format, wherein said first and second materials are distinct plastic materials, comprising the step of overmolding said card body on said support at a temperature higher than the respective vitreous transition temperatures of said materials and close to the transformation temperature of said second material.

6. A method according to claim 5, wherein each of said materials has a transformation temperature approximately 150° C. higher than the vitreous transition temperature of the material.

7. A method of manufacturing a card comprising a card body made of a first material and a support made of a second material, wherein said first and second materials are identical plastic materials, comprising the step of overmolding said card body on said support at a temperature at least 100° C. higher than the vitreous transition temperature of said materials.

8. A method according to claim 7, wherein each of said materials has a transformation temperature approximately 150° C. higher than the vitreous transition temperature of the material.

* * * * *